(12) United States Patent
Omi

(10) Patent No.: US 9,855,956 B2
(45) Date of Patent: Jan. 2, 2018

(54) DRIVING ASSIST DEVICE

(71) Applicant: DENSO CORPORATION, Kariya, Aichi-pref. (JP)

(72) Inventor: Takuhiro Omi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/117,885

(22) PCT Filed: Feb. 5, 2015

(86) PCT No.: PCT/JP2015/000518
§ 371 (c)(1),
(2) Date: Aug. 10, 2016

(87) PCT Pub. No.: WO2015/122158
PCT Pub. Date: Aug. 20, 2015

(65) Prior Publication Data
US 2016/0355190 A1     Dec. 8, 2016

(30) Foreign Application Priority Data
Feb. 12, 2014  (JP) .................................. 2014-024949

(51) Int. Cl.
*B60W 50/00* (2006.01)
*G05D 1/00* (2006.01)
(Continued)

(52) U.S. Cl.
CPC ........ *B60W 50/0098* (2013.01); *B60W 30/12* (2013.01); *B60W 30/16* (2013.01);
(Continued)

(58) Field of Classification Search
CPC .. B60W 50/0098; B60W 30/12; B60W 30/16; B60W 40/08; B60W 50/14;
(Continued)

(56) References Cited

U.S. PATENT DOCUMENTS

2006/0235615 A1    10/2006   Kato et al.
2010/0030434 A1*   2/2010    Okabe ..................... A61B 5/165
                                                                 701/48

(Continued)

FOREIGN PATENT DOCUMENTS

| JP | H10-309961 A | 11/1998 |
| JP | H10-315800 A | 12/1998 |
| JP | 2013-41524 A | 2/2013 |

*Primary Examiner* — Marthe Marc-Coleman
(74) *Attorney, Agent, or Firm* — Knobbe, Martens, Olson & Bear, LLP

(57) ABSTRACT

A driving assist device includes a driver state detection unit for detecting an inattentive state as a driver state, an alerting unit for altering the driver upon detection of the inattentive state of the driver, a driving operation unit for being operated by the driver for driving operations; and a driving state switching unit that switches at least one of the driving operations in an automated driving state to a manual driving state when the driver's operation of the driving operation unit is detected during the automated driving state of the vehicle. When at least one of the driving operations in the automated driving state is switched to the manual driving state by the driving state switching unit, the driver state detection unit detects whether the state of the driver is an excited state. When the excited state of the driver is detected, the alerting unit alerts the driver.

6 Claims, 5 Drawing Sheets

(51) Int. Cl.
  *G06N 5/04*   (2006.01)
  *B60W 30/12*  (2006.01)
  *B60W 30/16*  (2012.01)
  *B60W 50/14*  (2012.01)
  *B60W 40/08*  (2012.01)
  *G08G 1/16*   (2006.01)
  *G08B 21/02*  (2006.01)
  *G08B 21/06*  (2006.01)
  *G08B 25/08*  (2006.01)

(52) U.S. Cl.
  CPC ............ *B60W 40/08* (2013.01); *B60W 50/14* (2013.01); *G05D 1/0088* (2013.01); *G06N 5/04* (2013.01); *G08B 21/02* (2013.01); *G08B 21/06* (2013.01); *G08B 25/08* (2013.01); *G08G 1/16* (2013.01); *B60W 2050/0071* (2013.01); *B60W 2400/00* (2013.01); *B60W 2540/26* (2013.01); *B60W 2600/00* (2013.01)

(58) Field of Classification Search
  CPC ........ B60W 2050/0071; G05D 1/0088; G06N 5/04; G08B 21/02; G08G 1/16
  USPC .... 701/27, 70; 340/576, 575, 439, 428, 438, 340/457, 937; 180/272
  See application file for complete search history.

(56) References Cited

U.S. PATENT DOCUMENTS

| | | | |
|---|---|---|---|
| 2011/0121960 A1* | 5/2011 | Tsai ...................... | B60K 28/06 340/439 |
| 2011/0241862 A1* | 10/2011 | Debouk .............. | B60W 50/035 340/439 |
| 2012/0083960 A1* | 4/2012 | Zhu ...................... | G05D 1/0214 701/23 |
| 2014/0240132 A1* | 8/2014 | Bychkov .................. | A61B 5/18 340/576 |
| 2015/0066282 A1* | 3/2015 | Yopp .................... | G05D 1/0061 701/24 |

\* cited by examiner

FIG. 2

BASIC MEASUREMENT VALUES

| DETECTION ITEM | DETECTION CONTENT |
|---|---|
| FACE DIRECTION | LOOKING-ASIDE TIME AND STATIONARY TIME |
| BLINKING FREQUENCY | NUMBER OF BLINKS PER MINUTE |
| EYE OPEN DEGREE | RATIO OF EYE OPEN TIME IN A MINUTE |
| HEART RATE | NUMBER OF HEART BEATS PER MINUTE |
| BLOOD PRESSURE | MAXIMUM AND MINIMUM BLOOD PRESSURES |

DRIVING ASSIST DEVICE

CROSS REFERENCE TO RELATED APPLICATIONS

This application is based on Japanese Patent Application No. 2014-24949 filed on Feb. 12, 2014, the disclosure of which is incorporated herein by reference.

TECHNICAL FIELD

The present disclosure relates to a driving assist technology applied to a vehicle that is switchable between an automated driving state and a manual driving state. The technology assists a driver in driving the vehicle through detecting a state of the driver.

BACKGROUND ART

Technologies have been developed and put to practical use which ensure safe driving of a vehicle through detecting a state of the driver of the vehicle based on, for example, the direction of driver's line of sight and biological information about the driver (e.g. eyelid behavior and heart rate) and, when the driver is found inattentive, alerting the driver. Moreover, in recent years, vehicles have been introduced which automatically perform some of the driving operations (e.g. traveling, turning, and stopping) on behalf of the drivers to reduce the driving burden on drivers. It is also expected that automatically driven vehicles which can automatically perform all of acceleration, steering, and braking while allowing human drivers to take over the driving operations in an emergency will also be introduced for practical use soon.

An object of automated driving is to reduce the driving burden on drivers. Therefore, it is conceivable that as the drivers trust automated driving more strongly, the drivers leave more driving operations to the automated driving while taking risks a little bit more. As a result, there is a concern that the drivers are going to become more relaxed and inattentive during driving. If a driver becomes inattentive during driving and becomes unable to take action in an emergency, safety cannot be ensured in the event of an emergency. Hence, in proposed technologies to reduce the driving burden on a driver and to ensure driving safety, the state of the driver is monitored during automated driving, too. When the driver is found intolerably inattentive, the driver is alerted (Patent Literatures 1 and 2). The tolerable degree of driver's inattentiveness during automated driving may be desirably not much different from a tolerable degree during manual driving from the viewpoint of ensuring safe driving. This, however, may reduce the advantages of automated driving. Hence, in proposing the technologies in the above patent literature, various studies have been made concerning a maximum tolerable degree of driver's inattentiveness during automated driving.

PRIOR ART LITERATURES

Patent Literature

Patent Literature 1: JP 2006-318446A
Patent Literature 2: JP 2013-041524A

SUMMARY OF INVENTION

According to studies by the inventor of this application, however, no matter what maximum tolerable degree of driver's inattentiveness is set, it is difficult to ensure safe driving for the following reasons. Because it is true a driver of a vehicle can become inattentive more easily during automated driving than during manual driving, it is important to set an appropriate maximum tolerable inattentiveness degree for a driver so as to ensure safe driving. During the automated driving of the vehicle, however, there is possibility that the driver of the vehicle enters a driver state in which ensuring safe driving is difficult and which is supposed not to occur during manual driving. All in the technologies so far proposed fail to take this possibility into consideration. When the driver enters such a dangerous state unique to automated driving, it is difficult to ensure safe driving.

The present disclosure is made in view of the foregoing and has an object to provide a technology for ensuring safe traveling of a vehicle through detecting the state of the driver of the vehicle during automated driving.

A driving assist device in an example of the present disclosure is mounted in a vehicle to assist a driver in driving the vehicle through detecting a state of the driver, wherein the vehicle is switchable between a manual driving state in which driving operations for acceleration, braking and steering are manually performed by the driver and an automated driving state in which at least one of the driving operations is performed automatically. The driving assist device comprises: a driver state detection unit that detects whether the state of the driver is an inattentive state; an alerting unit that, when the inattentive state of the driver is detected, alerts the driver; a driving operation unit that is operated by the driver to perform the driving operations; and a driving state switching unit that, when the driver's operation of the driving operation unit is detected during the automated driving state of the vehicle, switches at least one of the driving operations in the automated driving state to the manual driving state. When at least one of the driving operations in the automated driving state is switched to the manual driving state by the driving state switching unit, the driver state detection unit detects whether the state of the driver is an excited state. When the excited state of the driver is detected, the alerting unit alerts the driver.

A driving assist method in an example of the present disclosure is applied to a vehicle to assist a driver in driving the vehicle through detecting a state of the driver, wherein the vehicle is switchable between a manual driving state in which driving operations for acceleration, braking and steering are manually performed by the driver and an automated driving state in which at least one of the driving operations is performed automatically. The driving assist method comprises: a driver state detection process that detects whether the state of the driver is an inattentive state; an alerting process that alerts the driver when the inattentive state of the driver is detected; and a driving state switching process that, when the driver's operation of the driving operation unit is detected during the automated driving state of the vehicle, switches at least one of the driving operations in the automated driving state to the manual driving state, wherein: when at least one of the driving operations in the automated driving state is switched to the manual driving state in the driving state switching process, it is detected in the driver state detection process whether the state of the driver is an excited state; and in the alert process, the driver is alerted when the excited state of the driver is detected.

It is generally considered that a vehicle driver tends to enter an inattentive state during automated driving. In that regard, compared with manual driving, automated driving tends to be performed following traffic regulations in any situation. Therefore, automated driving continued for a long period of time can cause the driver to feel stress. There are cases in which, as a result of growing of such stress, the driver wanting to be released from the stress tries to switch at least one of the driving operations in the automated driving state to the manual driving state by operating the manual operation unit during automated driving. Because the driver in the situation like this may be in a kind of excited state, it is detected whether the driver is in the excited state. When the driver is found excited, the driver is alerted. In this way, even when the driver enters a dangerous state peculiar to automated driving, the driver can be calmed down, and thereby, safe driving can be ensured.

BRIEF DESCRIPTION OF DRAWINGS

The above and other objects, features and advantages of the present disclosure will become more apparent from the following detailed description made with reference to the attached drawings. In the drawings:

FIG. 2 is a diagram illustrating basic measurement values for detecting a state of a driver;

EMBODIMENT FOR CARRYING OUT INVENTION

An embodiment of the present disclosure will be described below.

A. Device Configuration

Figure 1A:
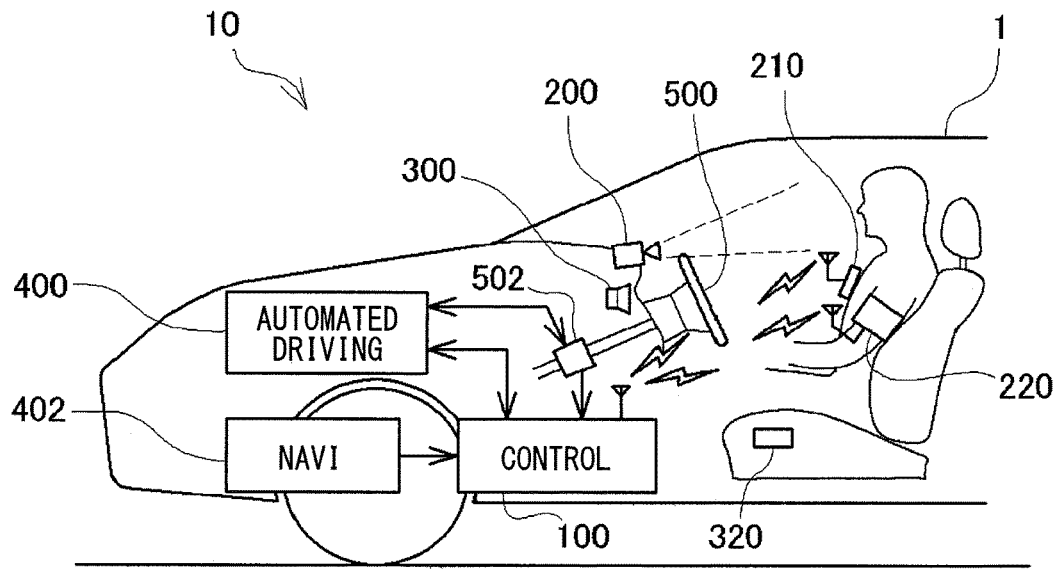
FIG. 1A is diagram illustrating a vehicle mounted with a driving assist device of an embodiment of the present disclosure.

FIG. 1A shows a vehicle 1 mounted with a driving assist device 10 of the present embodiment. As shown in FIG. 1A, the vehicle 1 is mounted with a control device 100 constituting a main part of the driving assist device 10 of the present embodiment, an automated driving device 400 for automatically driving the vehicle 1, and a car navigation system.

During manual driving, a driver drives the vehicle 1, for example, by steering a steering wheel 500 and operating an accelerator pedal and a brake pedal (not shown). After the driving state switches to automated driving, the automated driving device 400 operates, on behalf of the driver, the steering wheel 500, the accelerator pedal and the brake pedal. The steering wheel 500 has a shaft attached with an actuator 502 which has a built-in steering angle sensor. The automated driving device 400 operates the steering wheel 500 by driving the actuator 502 such that the steering angle sensor output equals a target value. The accelerator pedal and the brake pedal are also attached with actuators, not shown, respectively, having built-in sensors for detecting amounts of accelerator and brake operations. The automated driving device 400 detects accelerator and brake operation amounts based on the outputs of the respective sensors to operate the accelerator and the brake and drives the respective actuators.

The automated driving device 400 of the present embodiment will be illustrates as a device which automatically performs on behalf of the driver all of the accelerator operation to accelerate/decelerate the vehicle 1, brake operation to brake the vehicle 1, and steering wheel operation to steer the vehicle 1. Alternatively, the automated driving device 400 may be a device which automatically performs part of the above operations.

The vehicle 1 is mounted with a driver camera 200 to photograph the driver's face. Images taken by the driver camera 200 are inputted to the control device 100. In photographing the driver's face, light in a near-infrared wavelength range is mainly used. Also, in the present embodiment, the driver wears an electrocardiographic sensor 210 (denoted as "SENSOR A" in FIG. 1B and a blood pressure sensor 220 (denoted as "SENSOR B" in FIG. 1B). Data about the driver's heart rate and blood pressure is wirelessly inputted to the control device 100.

The control device 100 detects a driver's state based on driver's face image data and driver's heart rate and blood pressure data. When it is determined, for example, that the driver is in an inattentive state, the control device 100 alerts the driver, for example, by outputting various voices or sound effects from a speaker 300 or by driving a sheet vibration device 320 built into the driver seat. The control device 100 of the present embodiment can exchange data with the automated driving device 400 and the car navigation system 402. Therefore, even when the driver enters a dangerous state which can peculiarly occur during automated driving, the control device 100 can alert the driver of such a state and can, as a result, ensure safe driving.

Figure 1B:
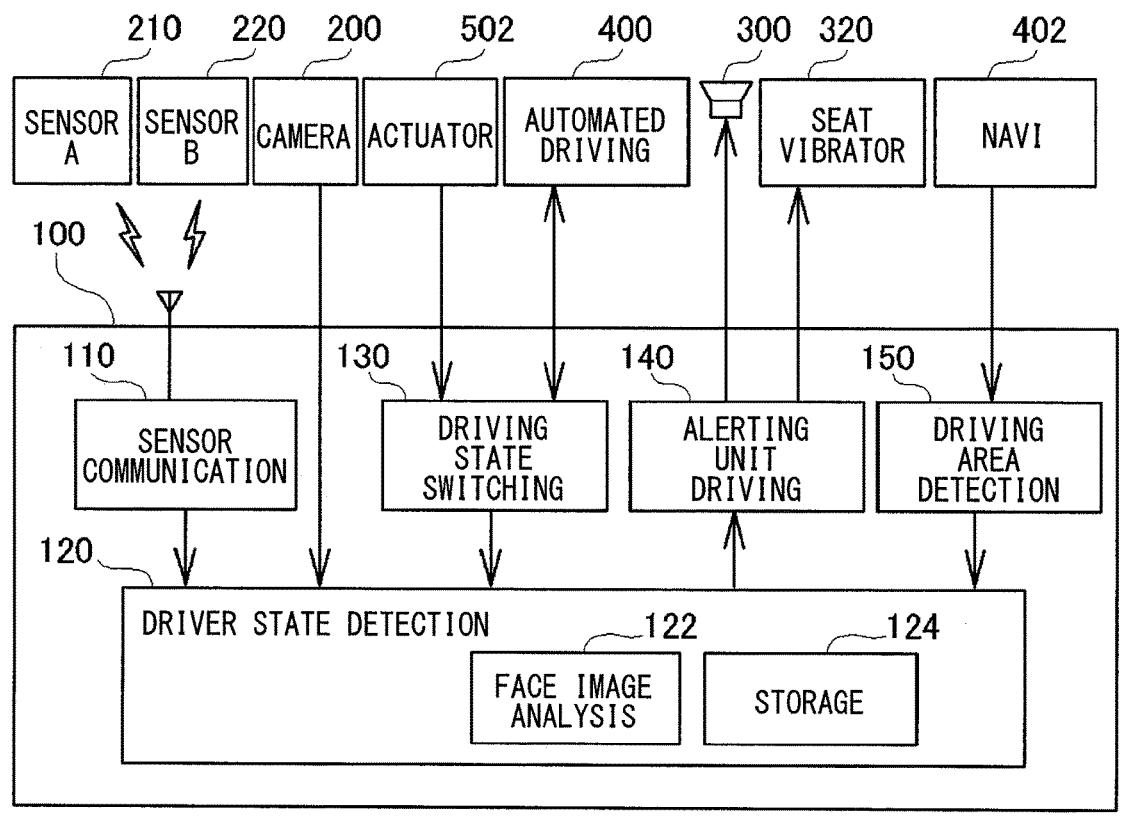
FIG. 1B is a diagram illustrating a configuration of the driving assist device according to the embodiment.

FIG. 1B outlines the internal configuration of the control device 100. As shown in FIG. 1B, the control device 100 of the present embodiment includes a sensor communication unit 110, a driver state detection unit 120, a driving state switching unit 130, an alerting unit 140, and a driving area detection unit 150. Note that these five units respectively represent abstract concepts obtained by conveniently classifying the interior of the control device 100 focusing on the function of the control device 100 to detect the driver's state and alert the driver. Namely, the five units do not represent five physically separated portions of the control device 100. Each of the units can be implemented either software-wise by a computer program to be executed by the control device 100 including a processor and an I/O unit or hardware-wise using an integrated circuit such as an LSI. It is, of course, possible to implement the units by combining software means and hardware means. The computer program is stored in a non-transitory storage medium like a semiconductor memory.

The sensor communication unit 110 communicating wirelessly (or wiredly) with the electrocardiographic sensor 210 and blood pressure sensor 220 collects driver data, for example, a driver's electrocardiogram and pulse rate data, and outputs such data to the driver state detection unit 120.

Image data on the driver's face photographed by the driver camera 200 (face image data) is inputted to the driver state detection unit 120 without involving the sensor communication unit 110 and is analyzed at a face image analysis unit 122 included in the driver state detection unit 120. Based on the received face image, the face image analysis unit 122 detects the driver's face direction, blinking frequency, and eye open degree.

The data on the driver's face direction, blinking frequency, and eye open degree as well as heart rate and blood pressure data obtained based on the driver's electrocardiograph and pulse rate provide measurement values to be used as basic data for detecting the driver's state (e.g. an inattentive state). In the following, such measurement values will be referred to as "basic measurement values." The basic measurement values will be described together in detail later with reference to drawings.

The driver state detection unit 120 detects the driver's state, for example, an inattentive state based on the basic measurement values. To detect the driver's state, comparison is made between the basic measurement values and reference values for driver state detection (hereinafter referred to as "detection reference values"). The detection reference values are pre-stored in a storage unit 124 included in the driver state detection unit 120.

When the driver is consequently detected as being in an inattentive state, the driver state detection unit 120 communicates the detection to an alerting unit 140. The alerting unit, then, alerts the driver by outputting a pre-stored voice or sound effect from the speaker 300 or by vibrating the driver sheet using the seat vibration device 320. However, the driver alerting method is not limited to outputting a voice or sound or vibrating the driver sheet. For example, the driver may be alerted by cold air blown to the driver using an air conditioner, not shown.

The control device 100 is also provided with the driving state switching unit 130. The driving state switching unit 130 exchanges data with the automated driving device 400 and can recognize an automated driving state of the vehicle 1, information on control target values for automated driving of the vehicle 1 by the automated driving device 400, and the like. Furthermore, the driving state switching unit 130 is coupled to the steering angle sensor built into the actuator 502 of the steering wheel 500.

When, in an automated driving state, the output of the steering angle sensor deviates largely from a corresponding control target value set for the automated driving device 400, the control device 100 determines that, during automated driving, the steering wheel 500 is operated by the driver. The control device 100 then outputs a signal for switching operation of the steering wheel 500 (steering operation) from an automated driving state to a manual driving state to the automated driving device 400. Also, when, during automated operation, the amount of accelerator pedal or brake pedal operation deviates largely from a corresponding control target value set for the automated operation device 400, the control device 100 outputs a signal for switching the accelerator pedal or brake pedal operation (acceleration or braking operation) from an automated driving state to a manual driving state to the automated operation device 400.

During automated driving, as a result of operation by the driver of the steering wheel 500, accelerator pedal, or brake pedal, driving operation is temporarily (or for a predetermined period of time) switched from an automated driving state to a manual driving state without going through a normal switching procedure. This event is generally referred to as an "override."

The control device 100 of the present embodiment is also provided with the driving area detection unit 150. The driving area detection unit 150 is coupled to the car navigation system 402. Therefore, information about whether or not automated driving is permitted in the road section where the vehicle 1 is currently traveling can be obtained from the car navigation system 402. For example, whereas there are many city road sections where automated driving is not permitted, automated driving is permitted in most sections of highways and automobile-only roads. In the car navigation system 402, information as to whether or not automated driving is permitted is stored in advance for all sections of most roads. The driving area detection unit 150 obtains such information by communicating with the car navigation system 402.

When a travel route has been set in the car navigation system 402, not only the information as to whether the current road section is one where automated driving is permitted but also other information can be obtained, for example, whether or not there is any road section ahead where automated driving is not permitted (automated driving prohibited section) and, if any exists, what the distance to the automated driving prohibited section is.

Though the present embodiment has been illustrated on the assumption that information as to whether automated driving is permitted is stored in the car navigation system 402 for individual road sections, an alternative method may be used. For example, the vehicle 1 may obtain such information from an external database using a wireless communication device, not shown, or by recognizing road signs. Or, for individual road sections which may include looping road sections at complicated grade-separated interchanges where it is difficult to make the determination by the car navigation system alone, it may be determined based on vehicle behavior whether automated driving is permitted.

In the present embodiment, the driver state detection unit 120 corresponds to a driver state detection means. The driving state switching unit 130 corresponds to a driving state switching means. The alerting unit 140 corresponds to an alerting means. The driving area detection unit 150 corresponds to a driving area detection means. The steering wheel 500 corresponds to a driving operation unit.

FIG. 2 outlines data (basic measurement values) used by the driver state detection unit 120 of the present embodiment. As described above, the basic measurement values include, for example, measurements of face direction, blinking frequency, and eye open degree, heart rate and blood pressure.

For the face direction, a duration during which the face direction detected from a face image and the direction of traveling of the vehicle 1 detected by a steering angle sensor (not shown) do not match is detected. When a driver is inattentive, he/she tends to neglect watching ahead in the traveling direction or his/her head portion tends to tilt. Therefore, when the duration during which the driver's face direction and the vehicle travel direction do not match is detected and when the duration exceeds a predetermined amount of time, it may be determined that the driver is in an inattentive state.

To detect the face direction from a face image, a well-known method can be used. For example, feature points of face parts such as inner and outer corners of eyes, nose and mouth are extracted from a face image, and the direction of the face is detected based on the positional relationship between the extracted feature points.

For the blinking frequency, eyelid behavior is detected by analyzing driver's face images photographed at a predetermined period (e.g. 30 ms) and, based on the detected eyelid behavior, the number of blinks per minute is detected.

For the eye open degree, the ratio of time during which the driver's eyes are open in a minute is detected based on the eye-lid (top lids) behavior. When a driver is inattentive, his/her blinking frequency and eye open degree tend to decline. When such values reach respective lower limit values, it may be determined that the driver is in an inattentive state.

For the heart rate, the number of driver's heart beats per minute is detected, and, for the blood pressure, maximum and minimum blood pressures are detected. When a driver is inattentive, his/her heart rate and blood pressure also tend to decline. Therefore, when the driver's heart rate and blood pressure reach respective lower limit values, it may be determined that the driver is in an inattentive state. An alternative well-known method may also be used to detect an inattentive state of the driver.

Detection of the driver's state has been described focusing on an inattentive state of the driver. When the driver is tired, the driver's state may also be detected, for example, focusing on poor physical condition of the driver.

The items of basic measurement values are not limited to the above-mentioned items. For example, the driver's pulse rate, brain waves, respiration, body motion, and body temperature may be detected as basic measurement values. In this case, the driver state detection unit 120 detects such basic measurement values using, for example, a pulse beat sensor, a brain wave sensor, a respiration sensor, a body motion sensor, and a thermometer.

B. Driving Assist Processing

Figure 3:
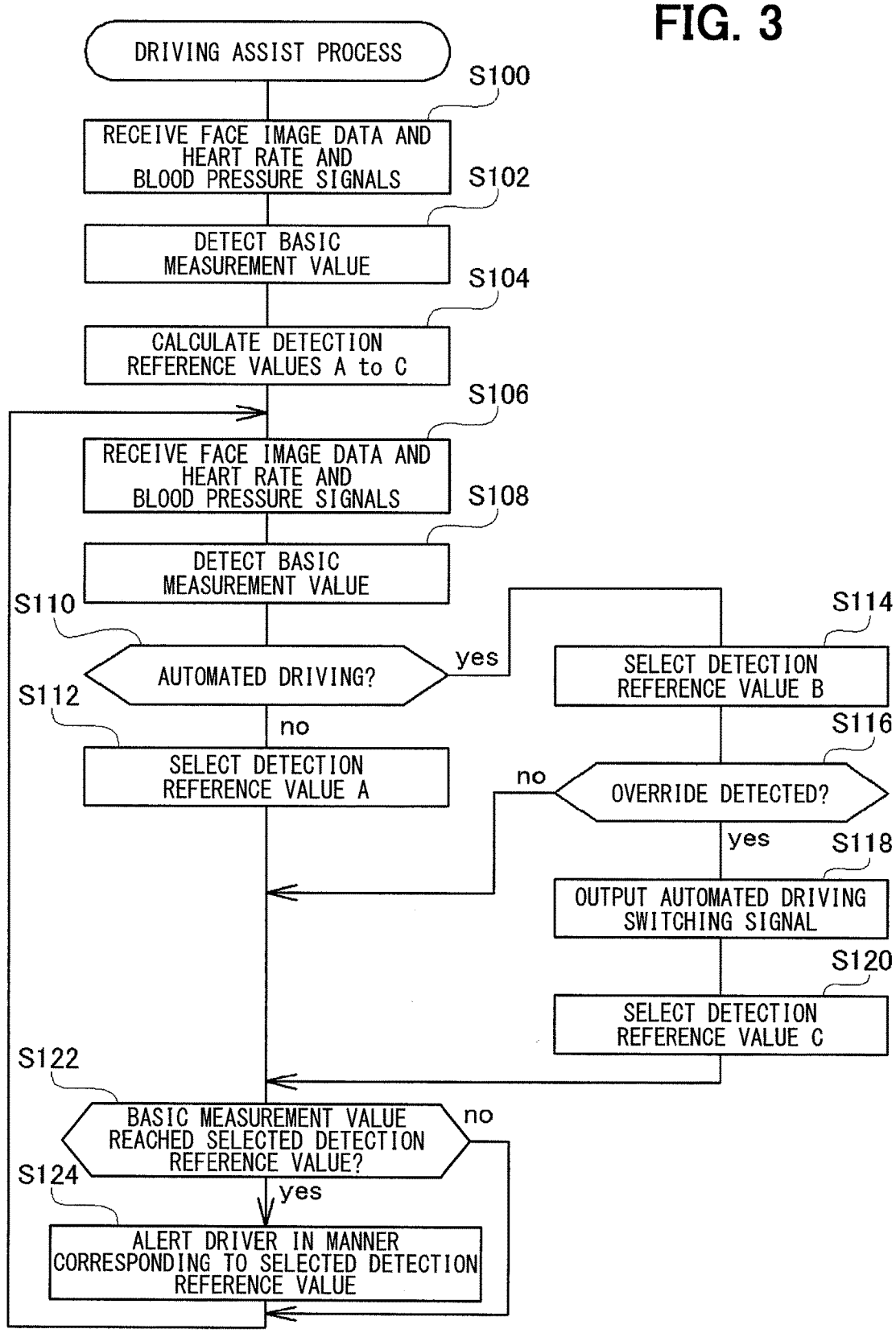
FIG. 3 is a flowchart of driving assist processing according to the embodiment.

FIG. 3 is a flowchart of driving assist processing performed by the control device 100 of the present embodiment. The driving assist processing is initiated upon start-up of the engine of the vehicle 1 and is carried out regardless of whether the vehicle 1 is in a manual driving state or in an automated driving state. As described in detail later, appropriate detection reference values for detecting the driver's state are set depending on whether the vehicle 1 is in a manual driving state or in an automated driving state, so that safe driving is ensured even if the driver enters a dangerous state peculiar to automated driving.

In the driving assist processing, as shown in FIG. 3, initially, driver's face image data captured by the driver camera 200 is received, and additionally, signals concerning the driver's heart rate and blood pressure are received from the electrocardiographic sensor 210 and blood pressure sensor 220, respectively (S100). Subsequently, the driver state detection unit 120 detects basic measurement values by analyzing the received data (S102).

The basic measurement values initially detected after a start-up of the engine (or detected in a predetermined period of time after a start-up of the engine) are used to calculate detection reference values for detecting the driver's state. In the present embodiment, three kinds of detection reference values are set. They are detection reference values A for detecting an inattentive state of the driver during manual driving; detection reference values B for detecting an inattentive state of the driver during automated driving; and detection reference values C for detecting an excited state of the driver during automated driving. Taking into consideration that the three kinds of detection reference values possibly vary between individuals, detection reference values for the driver of the vehicle 1 are calculated (S104) based on the basic measurement values detected in S102.

When the detection reference values are calculated using the basic measurement values detected in a predetermined period of time after the engine is started up, it is possible, even if detecting the basic measurement values temporarily becomes impossible for any reason, to appropriately calculate the detection reference values.

In the following, first, the three kinds of detection reference values will be outlined, then methods to calculate the three kinds of detection reference values taking into consideration differences between individuals will be described.

The detection reference values A for detecting an inattentive state of the driver during manual driving are as follows. Generally, it is known that, when a driver becomes inattentive, his/her blinking frequency lowers. The driver's eye open degree, heart rate, and blood pressure are also known to lower when the driver becomes inattentive. As for the face direction, when the driver becomes inattentive, it becomes difficult for the driver to keep watching ahead in the traveling direction and, as a result, the time during which the watching direction of the driver differs from the vehicle traveling direction (looking-aside time) increases. Or, when the driver becomes inattentive, the driver's behavior to grasp the surrounding situation for safety confirmation decreases and the driver's face direction tends to stay unchanged.

Therefore, regarding the blinking frequency, eye open degree, heart rate, and blood pressure, driver's entering an inattentive state can be detected by detecting lowering of their measurement values. Regarding the face direction, driver's entering an inattentive state can be detected by detecting an increase in the amount of time during which the driver is looking aside or the driver's face direction stays unchanged.

As described above, the detection reference values A are used to detect an inattentive state of the driver during manual driving.

During manual driving, even when the driver becomes only slightly inattentive, the vehicle 1 can enter a dangerous state. During automated driving, however, because the automated driving device 400 drives the vehicle on behalf of the driver, driver's entering a somewhat inattentive state should be tolerated. However, if the driver becomes extremely inattentive to extents that, for example, the driver cannot immediately take danger avoiding action in an emergency, the driver becomes unable to avoid danger in the event of an emergency by switching from automated driving to manual driving. Hence, it is conceivable that the driver's inattentive state to be detected during automated driving should be a more serious one than the driver's inattentive state to be detected during manual driving.

As described above, the detection reference values B are used to detect an inattentive state of the driver during automated driving. Since the driver's inattentive state to be detected during automated driving is severer than the driver's inattentive state to be detected during manual driving, the detection reference values B set for the blinking frequency, eye open degree, heart rate, and blood pressure are smaller than the corresponding detection reference values A. As for the driver's face direction, the detection reference value B to be set is greater than the detection reference value A.

Furthermore, for automated driving unlike for manual driving, it is necessary to take into consideration the possibility that the driver may enter an excited state. A reason for this is as follows. Firstly, automated driving is generally controlled not only to follow the traffic regulations but also to keep safety. Therefore, when the driver is, for any reason, in haste or irritated, the driver may feel stressed about automated driving. For example, when traveling following a preceding vehicle by automated driving, a good distance is kept from the preceding vehicle. This allows other vehicles to frequently pull in front of the automatically driven vehicle. In such a situation, it is conceivable that the driver in haste feels stressed and irritated to consequently enter a kind of excited state.

When the driver is excited, the blinking frequency, eye open degree, heart rate, and blood pressure are supposed to increase contrary to when the driver is in an inattentive state. As for the face direction, the driver is likely to lose composure to check the surrounding situation and will tend to keep watching ahead in the traveling direction of the vehicle 1. As a result, the time during which the watching direction of the driver differs from the vehicle traveling direction (i.e., looking-aside time) and the time during which the driver's face direction stays unchanged are considered to extremely decrease. It is, therefore, conceivable that driver's entering an excited state can be detected by detecting increases in the driver's blinking frequency, eye open degree, heart rate and blood pressure and a decrease in the looking-aside time or stationary time detected based on the face direction.

As described above, the detection reference values C are used to detect an excited state of the driver during automated driving.

The three kinds of detection reference values A to C are expected to differ between individuals. In S104 shown in FIG. 3, the three kinds of detection reference values A to C are determined as follows.

First, the detection reference values A are calculated based on the basic measurement values detected in S102. Namely, the detection reference values A for the blinking frequency, eye open degree, heart rate, and blood pressure are calculated by subtracting corresponding predetermined values from the basic measurement values detected in S102. In this way, appropriate detection reference values A taking into account differences between individuals can be determined. As for the face direction, it is conceivable that no individual difference need be taken into account, so that a predetermined value (e.g. 3 seconds) is determined as a detection reference value A.

The detection reference values B and C are calculated based on the detection reference values A. Namely, the detection reference values B for the blinking frequency, eye open degree, heart rate, and blood pressure are calculated by subtracting corresponding predetermined values from the corresponding detection reference values A. The detection reference values C for the blinking frequency, eye open degree, heart rate, and blood pressure are calculated by adding corresponding predetermined values to the corresponding detection reference values A.

The detection reference value B for the face direction is calculated by adding the detection reference value A for the face direction to a corresponding predetermined value. The detection reference value C for the face direction is calculated by subtracting a corresponding predetermined value from the detection reference value A for the face direction.

In S104 shown in FIG. 3, the three kinds of detection reference value A to C calculated as described above are stored in the storage unit 124 included in the driver state detection unit 120.

Subsequently, in the driving assist processing shown in FIG. 3, the driver's face image data and signals concerning the driver's heart rate and blood pressure are received again (S106), then the basic measurement values listed in FIG. 2 are detected (S108).

Next, it is determined whether the vehicle 1 is in an automated driving state (S110). The driving state switching unit 130 shown in FIG. 1B exchanges data with the automated driving device 400, so that the control device 100 can determine whether the vehicle 1 is in an automated driving state.

When the vehicle 1 is not in an automated driving state (S110: no), the vehicle 1 is considered to be in a manual driving state. Thus, the driver state detection unit 120 selects, out of the three kinds of detection reference values calculated in S104, the detection reference values A (S112). As described above, the three kinds of detection reference values calculated in S104 are stored in the storage unit 124.

When the vehicle 1 is in an automated driving state (S110: yes), the driver state detection unit 120 selects, out of the three kinds of detection reference values stored in the storage unit 124, the detection reference values B (S114).

Next, the control device 100 determines whether or not an override is detected (S116). As described above, an "override" refers to switching of driving operation from an automated driving state to a manual driving state as a result of the driver' operation during automated driving, for example, the driver' operation of the steering wheel 500. As described above with reference to FIG. 1B, the driving state switching unit 130 can detect whether the driver has caused an override by comparing the output of the steering angle sensor included in the actuator 502 with a corresponding control target value set for the automated driving device 400.

An override occurs only during automated driving. Therefore, after the detection reference values A for use in a manual driving state are selected (S112), the determination of whether an override has occurred is not made. Only after the detection reference values B are selected (S114), it is determined whether an override has occurred is determined (S116).

When an override is detected (S116: yes), an automated driving switching signal for temporarily (or for a predetermined amount of time) switching the driving operation into an automated driving state is sent from the driving state switching unit 130 to the automated driving device 400 (S118). As a result, the driving operation in an automated driving state is switched to a manual driving state. When the driving operation is switched to a manual driving state, either all driving operations in an automated driving state may be switched to a manual driving state or only the driving operation detected as having been manually performed by the driver may be switched to a manual driving state.

When, as described above, an override is detected (S116: yes) and the switch over to an automated driving state is made (S118), the driver state detection unit 120 selects the detection reference values C (S120) from the three kinds of detection reference values stored in the storage unit 124. Namely, when an override is detected, the detection reference value is switched over from the detection reference values B selected in S114 to the detection reference values C. As described above, the detection reference values C are used to detect an excited state of the driver during automated driving.

When no override is detected (S116: no), neither the processing to output an automated driving switching signal to the automated driving device 400 (S118) nor the processing to select the detection reference values C (S120) is performed.

When the detection reference values A, B or C calculated in S104 are selected (S112, S114, S120), it is determined whether the basic measurement values earlier detected in S108 reach the selected detection reference values.

In cases where the detection reference values A or B are selected, the basic reference values for the blinking frequency, eye open degree, heart rate, and blood pressure are considered to be greater than the values set as the corresponding detection reference values. In such cases, therefore, it is determined in S122 whether any of the basic measurement values decreases to the corresponding detection reference value. As for the face direction, the basic measurement value is considered to be smaller than the corresponding detection reference value that has been set, and thus, it is determined in S122 whether the basic measurement value increases to the corresponding detection reference value.

In cases where the detection reference values C are selected, the basic reference values for the blinking frequency, eye open degree, heart rate, and blood pressure are considered to be smaller than the values set as the corresponding detection reference values. In such cases, therefore, it is determined in S122 whether any of the basic measurement values increases to the corresponding detection reference values. As for the face direction, the basic measurement value is considered to be greater than the corresponding detection reference value C that has been set, and thus, it is determined in S122 whether the basic measurement value decreases to the corresponding detection reference value.

In the present embodiment, when any of the basic measurement values of the blinking frequency, eye open degree, heart rate, blood pressure, and face direction reaches the corresponding detection reference value, it is determined that the driver is in an inattentive state or in an excited state. Alternatively, it may be determined that the driver is in an inattentive state or an excited state based on determination results for a plurality of basic measurement values.

For example, it may be determined that the driver is in an inattentive state or an excited state when, out of the basic measurement values, the number of those reaching the corresponding detection reference values reaches a predetermined number. Or, it may be determined that the driver is in an inattentive state or an excited state when, in a specific group of basic measurement values (e.g. heart rate and blood pressure value), every basic measurement value reaches corresponding detection reference value. In this way, it can be determined with higher reliability that the driver is in an inattentive state or an excited state.

As a result of comparing the basic measurement values and the detection reference values as described above, when no basic measurement value is determined to reach a corresponding detection reference value (S122: no), processing returns to S106 to receive new image data on the driver's face and signals concerning the driver's heart rate and blood pressure. Based on the newly received data and signals, new basic measurement values are detected (S108) and the subsequent series of processes are performed in the above described way.

When any basic measurement value is determined to reach a corresponding detection reference value (S122: yes), the driver is alerted in a manner according to the corresponding detection reference value (S124).

For example, in cases where the detection reference values A are selected, an alarm sound is outputted from the speaker 300 or cold air is blown to the driver from an air conditioner, not shown, so as to make the driver leave the inattentive state. Or, the driver seat may be vibrated using the seat vibration device 320.

In cases where the detection reference values B are selected, because the vehicle 1 is considered to be in an automated driving state, the alarm sound is outputted and the cold air is blown in more moderate manners than in cases where the detection reference values A are selected.

In cases where the detection reference values C are selected, the driver is considered to be in an excited state. In such cases, a sound effect to make the driver relax or gently alerting voice is outputted from the speaker 300. Also, from an air conditioner, colder air than in the other cases is blown so as to cool the driver down.

By alerting the driver in the above manners, the driver in an inattentive state can be placed in an attentive state and the driver in an excited state can be calmed down.

After alerting the driver (S124), processing returns to S106 and repeats the subsequent series of processes as described above.

In the present embodiment, S122 and S224 performed by the control device 100 correspond to a driver state detection process. S124 and S226 performed by the control device 100 correspond to an alerting process. S118 and S218 performed by the control device 100 correspond to a driving state switching process.

By performing the driving assist processing of the present embodiment as described above, it is possible to control the state of the driver's mind and ensure safe traveling of the vehicle 1. This will be described in detail in the following.

Figure 4A:
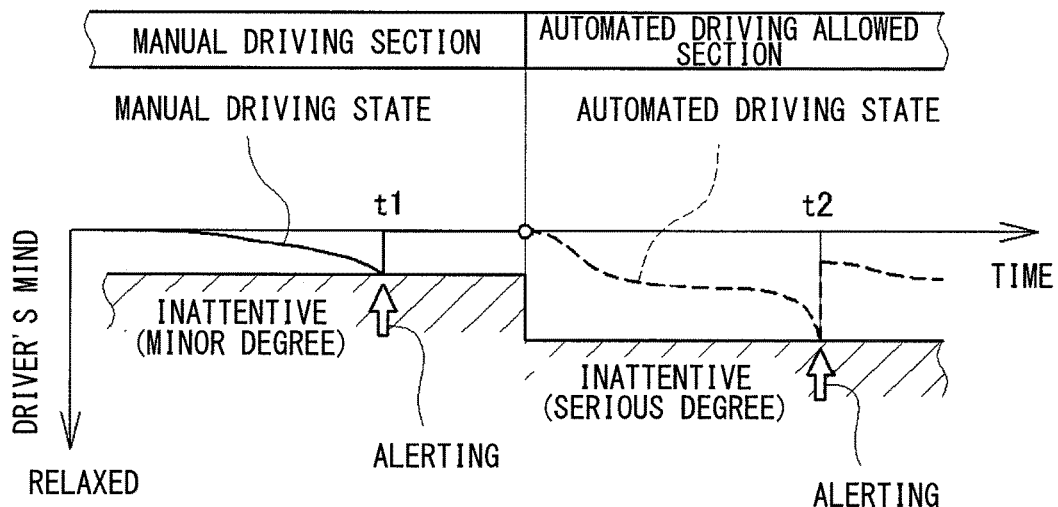
FIG. 4A is a diagram conceptually illustrating an example of how the state of the driver's mind changes while the vehicle is traveling.

FIG. 4A conceptually illustrates how the driver's mind changes while the vehicle 1 is traveling. In a manual driving section, the driver has to drive the vehicle 1 through operating the steering wheel, brake pedal, and accelerator pedal himself/herself while checking the surrounding situation. While driving for a long period of time under such circumstances, the driver's alertness decreases and the driver becomes inattentive. As the driver's inattentiveness grows, driving safety is threatened. Therefore, when the driver's inattentiveness grows to a certain degree (minor degree), the driver is alerted as shown at time t1 in FIG. 4A. As a result, the driver's alertness recovers to a normal state.

When the vehicle 1 enters an automated driving section (a road section where automated driving is permitted) and automated driving is started, the automated driving device 400 drives the vehicle 1 on behalf of the driver, and this relaxes the driver. As a result, it becomes easier for the driver to become inattentive. Since automated driving is for reducing the burden on the driver, an inattentive state of the driver to a certain degree is considered tolerable. However, if the driver enters an extremely inattentive state, for example, to such extents that the driver cannot immediately take danger avoiding action even in an emergency, it becomes difficult to ensure safety in the event of an emergency to ensure safety even if an attempt to switch from automated driving to manual driving is made. Hence, during automated driving unlike during manual driving, the driver is not alerted while the driver's inattentiveness is of a minor degree, but, when the driver's inattentiveness grows serious (to a serious degree) as at time t2 shown in FIG. 4A, the driver is alerted.

In this way, during automated driving, the driver's mind is maintained at such an inattentive state that, while being relaxed to a certain degree, the driver is able to switch from automated driving to manual driving in the event of an emergency to ensure safety (see FIG. 4A).

As compared with manual driving, during automated driving, the traffic regulations are more strictly followed. Therefore, when automated driving is continued for a long period of time, the driver may feel stress. For example, during automated driving, a good distance is kept from a preceding vehicle. This allows other vehicles to easily pull in front of the automatically driven vehicle and causes the driver of the automatically driven vehicle to feel stress. Because of the stress, the driver who initially felt relaxed may become tense. This tendency is more conspicuous when the driver is in haste for any reason or irritated.

Figure 4B:
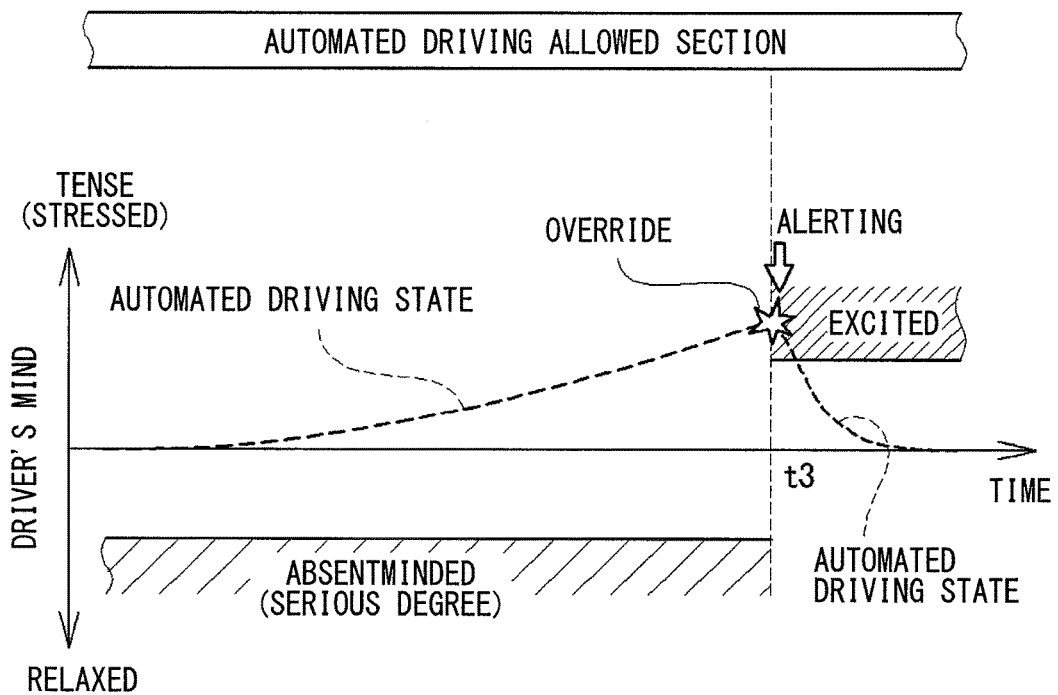
FIG. 4B is a diagram conceptually illustrating another example of how the state of the driver's mind changes while the vehicle is traveling.

FIG. 4B conceptually illustrates how the duration of the automated driving for a long period of time provides the stress to the driver and the stress shifts the driver's mind from a relaxed side to a tense side. It is conceivable that when the driver's tension rises beyond a certain level, the driver makes an override in order to be released from the stress. In this case, the driver is in an excited state contrary to the inattentive state that had been detected so far during automated driving. In such a situation, the driver is highly likely to operate, for example, the steering wheel 500 and the accelerator pedal roughly. Or, the driver is highly likely to drive recklessly.

Hence, when the driver makes an override during automated driving, it is determined at time t3 whether the driver is excited, as shown in FIG. 4B. When it is determined that the driver is excited, a voice message, for example, "Aren't you a little irritated?" is outputted to alert the driver. In this way, it is possible, as shown in FIG. 4B, to calm down the driver so as to prevent the driver from driving in a dangerous manner.

After an override is detected in S116 (S116: yes), determining whether the driver is excited is repeated until a predetermined period of time elapses. In this way, when the driver alerted once is not calmed down, it is possible to alert the driver again. Also, in cases where the degree of the driver's excited state immediately after detection of an override does not requires the alert but thereafter he or she gets excited to extents that require the alert, it is possible to alert the driver to calm him/her down. Furthermore, since, after detection of an override, determining whether the driver is excited is repeated until a predetermined period of time elapses, even in cases where a driver's excited state cannot be correctly detected for any reason immediately after detection of an override, the driver's excited state can be eventually detected and the driver can be alerted.

In the present embodiment described above, an excited state of the driver is detected after an override is made by the driver. In that regard, since it is conceivable that the driver makes an override after feeling stressed and entering an excited state, one may suppose that detection of an excited state of the driver be performed before an override occurrence. Nevertheless, in the present embodiment, detection of an excited state of the driver is performed after an override made by the driver is detected. The reason for this is as follows.

Firstly, occurrence of an override means that the vehicle 1 is driven automatically until the override. Even if the driver feels intensely stressed, as long as the vehicle 1 is being automatically driven, driving safety is not immediately threatened. In such a situation, driving safety is only potentially threatened.

However, when an override results in switching from automated driving to manual driving, the possibility of threatening driving safety sharply increases. By taking into account these, after detection of an override, the present embodiment determines whether the driver is excited. When it is determined that the driver is excited, measures for ensuring safety are taken (the driver is alerted).

Needless to say, one do not have to inhibit detecting, before occurrence of an override, an excited state of the driver and alerting the driver. For example, when a greatly excited state of the driver is detected, the driver may be alerted as a precaution even before an override is made.

C. Modification

In the embodiment described above, whenever an override occurs during automated driving, it is determined whether the driver is excited. Alternatively, when an override occurs during automated driving, it is detected, under predetermined situation, whether the driver is in the excited state. This modification will be briefly described focusing on a difference between the foregoing embodiment and the modification. In describing the modification, configurations of the modification similar to those of the foregoing embodiment will be denoted by the same reference numerals as used for the foregoing embodiment and detailed description of such similar configurations will be omitted.

Figure 5:
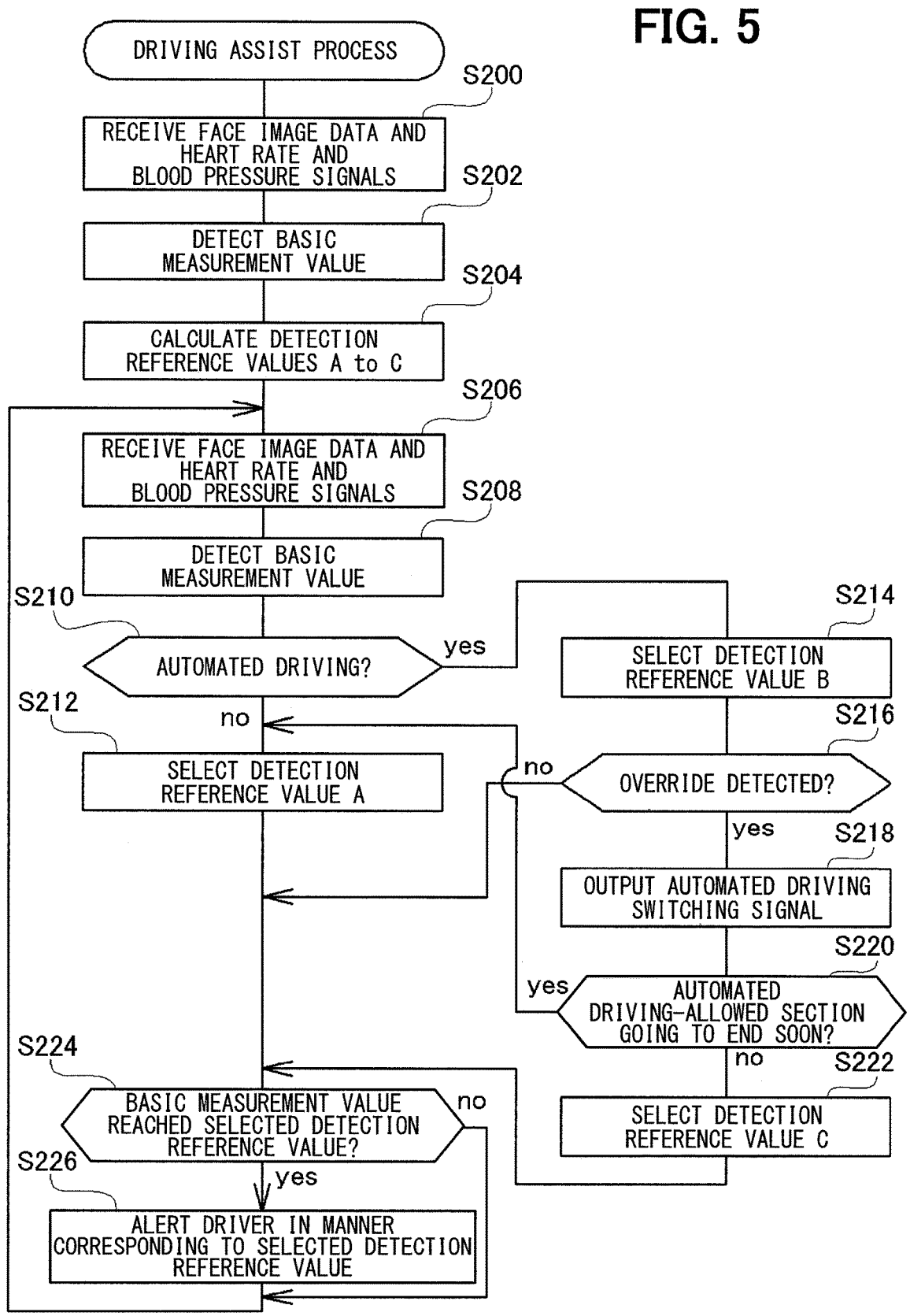
FIG. 5 is a flowchart of driving assist processing according to a modification of the embodiment.

FIG. 5 is a flowchart of driving assist processing of the present modification. When the driving assist processing is started, the control device 100 of the present modification like in the foregoing embodiment receives driver's face image data captured by the driver camera 200, and receives signals concerning the driver's heart rate and blood pressure from the electrocardiographic sensor 210 and blood pressure sensor 220, respectively (S200). Subsequently, basic measurement values are detected by analyzing the received data (S202).

Next, the foregoing three kinds of detection reference values A to C are calculated (S204). The contents of and the calculation manner of the detection reference values A to C are the same as described in connection with the foregoing embodiment, and thus, redundant description will not be repeated. The detection reference values A to C calculated are stored in the storage unit 124.

Subsequently, the driver's face image data and signals concerning the driver's heart rate and blood pressure are received again (S206). Based on the received data and signals, new basic measurement values are detected (S208).

Next, it is determined (S210) whether the vehicle 1 is in an automated driving state. When the vehicle 1 is not in an automated driving state (S210: no), the detection reference values A for a manual driving state are selected (S212).

When the vehicle 1 is in an automated driving state (S210: yes), the detection reference values B for an automated driving state are selected (S214).

Subsequently, the control device 100 determines whether or not an override is detected (S216). When it is determined that an override is detected (S216: yes), an automated driving switching signal for switching from automated driving to manual driving is sent from the driving state switching unit 130 to the automated driving device 400 (S218). As a result, the driving operation is switched from an automated driving state to a manual driving state.

In the driving assist processing of the present modification, after the automated driving switching signal is sent (S218), it is determined (S220) whether the current road section where automated driving is permitted (automated driving permitted section) will end soon. As shown in FIG. 1B, the driving area detection unit 150 included in the control device 100 can obtain, by communicating with the car navigation system 402, such information as whether or not automated driving is permitted in the road section where the vehicle 1 is currently traveling, whether or not there is any road section ahead where automated driving is not permitted (automated driving prohibited section) and, if any exists, what the distance to the automated driving prohibited section is. In S220, based on such information, it is determined whether the current road section where automated driving is permitted will end soon (e.g. will end at a location about 2 km ahead).

When, as a result, it is determined that the current road section where automated driving is permitted will not end soon (will still continue) (S220: no), the detection reference values C for detecting an excited state of the driver are selected (S222).

When it is determined that the current road section where automated driving is permitted will end soon (S220: yes), the detection reference values A for detecting an inattentive state of the driver are selected (S212). The reason why the detection reference values C for detecting an excited state of the driver are not selected despite the fact that an override was made by the driver during automated driving is as follows.

Firstly, in a situation where the current automated driving-permitted section is about to end, it is conceivable that the driver is aware of the situation and thinks it is necessary to switch to manual driving soon. In such a situation, when the driver knows that an override during automated driving causes the automated driving to be switched to manual driving, the driver possibly switches to manual driving by making an override without following a normal procedure for switching automated driving to manual driving.

Or, there can be cases where, after entering an inattentive state during automated driving, the driver does not recognize early enough an impending end of the automated driving permitted section and hastily operates the steering wheel 500 or presses the brake pedal.

As described above, when an automated driving permitted section is about to end, even if an override is made by the driver during automated driving, it is not always true that the override results from strong stress felt by the driver. Therefore, in the driving assist processing of the present modification, even after detection of an override during automated driving (S216: yes), when it is determined that the automated driving permitted road section is about to end (S220: yes), the detection reference values A for a manual driving state are selected in accordance with the switch over to the manual driving resulting from the override.

After the detection reference values A, B, or C are selected as described above (S212, S214, S222), it is determined (S224) whether the basic measurement values earlier detected in S208 reach the selected detection reference values. When it is determined that any of the detected basic measurement values reaches a corresponding one of the selected detection reference values (S224: yes), the driver is alerted in a manner corresponding to the detection reference value (S226). The manner in which the driver is alerted is the same as described in connection with the foregoing embodiment and the description will not be repeated herein.

When no basic measurement value reaches a corresponding detection reference value (S224: no), processing returns to S206 to receive new image data on the driver's face and signals concerning the driver's heart rate and blood pressure. Based on the newly received data and signals, new basic measurement values are detected (S208) and the subsequent series of processes are performed as described above.

In the present modification described above, even if an override is made during automated driving, when the override is considered not attributable to the stress felt by the driver, the determination of whether or not the driver is excited is not made. In this way, it is possible to avoid a situation in which, based on erroneous determination that the driver is excited, the driver is alerted by a voice message, for example, "Aren't you irritated?" In this way, improperly displeasing the driver can be avoided.

The above-described modification represents a case in which, when the current road section where automated driving is permitted is to end soon, even after occurrence of an override during automated driving, the determination of whether the driver is excited is not made. In other cases, too, when an override detected is considered not attributable to the stress felt by the driver, the determination of whether the driver is excited may not be made.

For example, when approaching a service area or a parking area while driving on a highway, the driver may make an override before pulling into the service area or the parking area. In such a case, too, the determination of whether the driver is excited may not be made.

Embodiment and configurations according to the present disclosure have been illustrated, but these do not limit the present disclosure. Other embodiments and configurations obtained by appropriately combining technical elements disclosed in different embodiments and configurations are also within embodiments and configurations according to the present disclosure.

The invention claimed is:

1. A driving assist device mounted in a vehicle to assist a driver in driving the vehicle through detecting a state of the driver, the vehicle being switchable between a manual driving state in which driving operations for acceleration, braking and steering are manually performed by the driver and an automated driving state in which at least one of the driving operations is performed automatically, the driving assist device comprising:
   a processor comprising circuitry,
   a memory storing a computer program;
   a driver state detection unit by having the processor executes the computer program is configured to detect whether the state of the driver is an inattentive state;
   an alerting unit by having the processor executes the computer program, when the inattentive state of the driver or the excited state of the driver is detected, alerts the driver;
   a driving operation unit comprising a steering wheel that is operated by the driver to perform the driving operations; and
   a driving state switching unit by having the processor executes the computer program, when the driver's operation of the driving operation unit is detected during the automated driving state of the vehicle, switches at least one of the driving operations in the automated driving state to the manual driving state,
wherein:
   when at least one of the driving operations in the automated driving state is switched to the manual driving state by the driving state switching unit, the driver state detection unit detects whether the state of the driver is an excited state; and
   when the excited state of the driver is detected, the alerting unit alerts the driver.

2. The driving assist device according to claim 1, wherein when at least one of the driving operations in the automated driving state is switched to the manual driving state by the driving state switching unit, the driver state detection unit detects, over a predetermined period of time, whether the driver is in the excited state.

3. The driving assist device according to claim 1, wherein: when the excited state of the driver is detected, the alerting unit alerts the driver in a different manner than when the inattentive state of the driver is detected.

4. The driving assist device according to claim 1, further comprising:
   a driving area detection unit that detects whether an automated driving-prohibited area where the vehicle is not permitted to be driven in the automated driving state exists in a forward traveling direction of the vehicle,
wherein:
   in cases where the automated driving-prohibited area is detected, even when at least one of the driving operations in the automated driving state is switched to the manual driving state by the driving state switching unit, the driver state detection unit detects not whether the driver is in the excited state but whether the driver is in the inattentive state.

5. A driving assist method to be applied to a vehicle to assist a driver in driving the vehicle through detecting a state of the driver, the vehicle being switchable between a manual driving state in which driving operations for acceleration, braking and steering are manually performed by the driver and an automated driving state in which at least one of the driving operations is performed automatically, the driving assist method performed by a processor executing a computer program stored in a memory comprising:

a driver state detection process performed by the processor that detects whether the state of the driver is an inattentive state;

an alerting process that alerts the driver when the inattentive state of the driver is detected; and a driving state switching process that, when the driver's operation of the driving operation unit is detected during the automated driving state of the vehicle, switches at least one of the driving operations in the automated driving state to the manual driving state, wherein:

when at least one of the driving operations in the automated driving state is switched to the manual driving state in the driving state switching process, it is detected in the driver state detection process whether the state of the driver is an excited state; and in the alert process, the driver is alerted when the excited state of the driver is detected.

6. A driving assist device mounted in a vehicle to assist a driver in driving the vehicle through detecting a state of the driver, the vehicle being switchable between a manual driving state in which driving operations for acceleration, braking and steering are manually performed by the driver and an automated driving state in which at least one of the driving operations is performed automatically, the driving assist device comprising:

a processor comprising circuitry, a memory storing a computer program;

a driver state detection unit by having the processor executes the computer program is configured to detect whether the state of the driver is an inattentive state or an excited state;

an alerting unit by having the processor executes the computer program, when the inattentive state of the driver or the excited state of the driver is detected, alerts the driver;

a driving operation unit comprising a steering wheel that is operated by the driver to perform the driving operations; and a driving state switching unit by having the processor executes the computer program, when the driver's operation of the driving operation unit is detected during the automated driving state of the vehicle, switches at least one of the driving operations in the automated driving state to the manual driving state, wherein:

the driving state detection unit by having the processor executes the computer program detects the inattentive state of the driver both in the manual driving state and in the automated driving state, and when at least one of the driving operations in the automated driving state is switched to the manual driving state by the driving state switching unit, the driver state detection unit detects that the state of the driver is the excited state and not the inattentive state; and when the excited state of the driver is detected, the alerting unit alerts the driver.

* * * * *